(12) United States Patent  
Nagai et al.

(10) Patent No.: US 8,801,243 B2  
(45) Date of Patent: Aug. 12, 2014

(54) VEHICLE INTERIOR ILLUMINATION LAMP

(75) Inventors: Kentaro Nagai, Haibara-gun (JP); Yoshinori Hirayama, Yokohama (JP)

(73) Assignee: Yazaki Corporation, Tokyo (JP)

( * ) Notice: Subject to any disclaimer, the term of this patent is extended or adjusted under 35 U.S.C. 154(b) by 1235 days.

(21) Appl. No.: 11/121,040

(22) Filed: May 4, 2005

(65) Prior Publication Data

US 2005/0254250 A1    Nov. 17, 2005

(30) Foreign Application Priority Data

May 10, 2004    (JP) ............................... P2004-140362

(51) Int. Cl.  
*B60Q 1/00*    (2006.01)

(52) U.S. Cl.  
USPC .......................................... 362/490; 362/488

(58) Field of Classification Search  
USPC ......................................................... 362/490  
See application file for complete search history.

(56) References Cited

U.S. PATENT DOCUMENTS

| | | | |
|---|---|---|---|
| 4,880,950 A | 11/1989 | Carson et al. | |
| 4,979,083 A | 12/1990 | Takano et al. | |
| 6,084,192 A | 7/2000 | Honma | |
| 6,364,512 B1 * | 4/2002 | Logel | 362/490 |
| 6,543,918 B1 * | 4/2003 | Nagata | 362/490 |
| 6,595,668 B2 * | 7/2003 | Hatagishi et al. | 362/490 |
| 2001/0033493 A1 * | 10/2001 | Logel et al. | 362/490 |

FOREIGN PATENT DOCUMENTS

| | | |
|---|---|---|
| DE | 41 33 527 A1 | 4/1993 |
| DE | 44 47 527 C2 | 4/1994 |
| DE | 101 48 107 A1 | 10/2002 |
| EP | 1 160 128 A1 | 12/2001 |
| JP | 10-289774 A | 10/1998 |
| JP | 11-258005 A | 9/1999 |
| JP | 2001-88630 A | 4/2001 |
| JP | 2001-171430 A | 6/2001 |

OTHER PUBLICATIONS

Japanese Office Action dated Nov. 19, 2008.

* cited by examiner

*Primary Examiner* — William Carter  
(74) *Attorney, Agent, or Firm* — Sughrue Mion, PLLC (57) ABSTRACT

A vehicle interior illumination lamp 11 is formed by a function portion 12 and a design portion 13. Retaining claws 15 are formed on side surfaces of a base housing 41 of the design portion 13. Operating plates 33 are formed at a housing 21 of the function portion 12, and each operating plate 33 has retaining portions 34 with which retaining claws 51 on the design portion 13 (which can be fitted into the function portion 12) can be retainingly engaged, respectively. The operating plates 33 are pressed from the inside of a bulb receiving chamber 44 of the design portion 13 to be elastically deformed, thereby releasing the retaining engagement of the retaining portions 34 with the retaining claws 51.

7 Claims, 7 Drawing Sheets

VEHICLE INTERIOR ILLUMINATION LAMP

BACKGROUND OF THE INVENTION

1. Field of the Invention

This invention relates to a vehicle interior illumination lamp mounted on a ceiling of a vehicle.

2. Related Art

Figure 10:
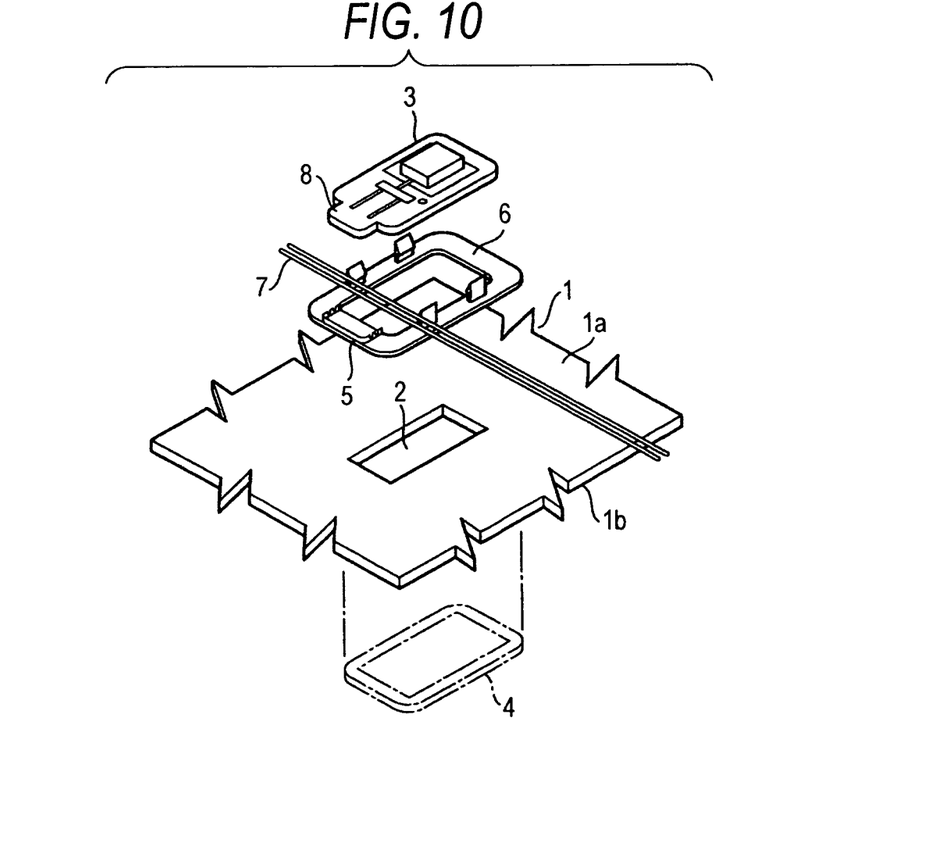
FIG. 10 is an exploded, perspective view explanatory of the structure of a conventional interior illumination lamp.

Generally, a vehicle has an interior illumination lamp provided at its ceiling. As shown in FIG. 10, one such known interior illumination lamp includes an electrical part 3 mounted on a reverse side (non-vehicle room side) 1a of an interior member 1 (forming the ceiling of the vehicle) in such a manner that the electrical part 3 is partially exposed through an opening 2 in the interior member 1, and a cover member 4 which is fitted to the opening 2 from the inside of a vehicle room 1b (see, for example, Unexamined Japanese Patent Publication 2001-88630).

In this interior illumination lamp, an electrical part-holding member 6, having a wire holding portion 5, is provided in the vicinity of the opening 2 in the interior member 1, and this electrical part-holding member is either fixed to the interior member 1 by an adhesive, an adhesive double coated tape or the like or is molded integrally with the interior member 1. Wires 7 are held on the wire holding portion 5, and in this condition the electrical part 3 is engaged with the electrical part-holding member 6 at the non-vehicle room side 1a, and also the wires 7 are press-fitted in contacts of wire connection portion 8 of the electrical part 3.

In the above interior illumination lamp, it is necessary to fix the electrical part-holding member 6 and the cover member 4 to the interior member 1 separately from each other, and therefore the efficiency of the assembling operation is not good. In addition, the region where the electrical part-holding member 6 and the electrical part are engaged with each other is disposed at the non-vehicle room side 1a, and besides the electrical part-holding member 6 is either adhesively bonded to or molded integrally with the interior member 1, and therefore the electrical part 3 could not be removed from the inside of the vehicle room 1b, so that the maintenance could not be effected easily.

SUMMARY OF THE INVENTION

This invention has been made in view of the above circumstances, and an object of the invention is to provide a vehicle interior illumination lamp in which the efficiency of an assembling operation is enhanced, and also a maintenance operation can be effected easily.

The above object has been achieved by a vehicle interior illumination lamp of the present invention having features recited in hereinafter.

The vehicle interior illumination lamp comprising a function portion, and a design portion, wherein when the design portion is fitted into the function portion, the design portion and the function portion are combined together through a ceiling plate, and are mounted on the ceiling plate in such a manner that the design portion and the function portion holds the ceiling plate therebetween; provided in that:

the function portion includes an elastically-deformable operating plate having a retaining portion with which a retaining claw, formed on the design portion, is retainingly engaged when the design portion is fitted in the function portion; and when the operating plate is pressed from the inside of the design portion to be elastically deformed, the retaining engagement of the retaining portion with the retaining claw is released.

The vehicle interior illumination lamp, recited in the described above, is further provided in that the operating plate has an operating projection projecting into the inside of the design portion fitted in the function portion.

The vehicle interior illumination lamp, recited in the described above, is further provided in that the function portion includes an elastic deformation limitation piece portion which is provided forwardly of the operating plate (which can be pressed from the inside of the design portion to be elastically deformed) in a direction of elastic deformation of the operating plate so as to limit the amount of elastic deformation of the operating plate.

In the vehicle interior illumination lamp of the described above, when the design portion is fitted into the function portion through the ceiling plate, the retaining portion of the function portion is retainingly engaged with the retaining claw of the design portion, so that the design portion is combined with the function portion. Therefore, the efficiency of the operation for assembling the function portion and the design portion together is greatly enhanced.

And besides, when the operating plate is pressed from the inside of the design portion to be elastically deformed, the retaining engagement of the retaining portion with the retaining claw is quite easily released, so that the function portion and the design portion can be separated from each other, and therefore the maintenance operation can be easily carried out.

In the vehicle interior illumination lamp of the described above, the finger is engaged with the operating projection projecting into the inside of the design portion, and the function portion is pulled toward the design portion by the finger. By doing so, the design portion can be quite easily fitted into the function portion, and the design portion and the function portion can be combined together, with the retaining portion of the function portion retainingly engaged with the retaining claw of the design portion. Therefore, the function portion and the design portion which have been separated from each other for maintenance purposes can be easily assembled together, and the maintenance operation can be carried out easily.

In the vehicle interior illumination lamp of the described above, even when the operating plate is pressed hard outwardly so as to remove the function portion from the design portion, the elastically-deformation operating plate is brought into abutting engagement with the elastic deformation limitation piece portion disposed forwardly of the operating plate in the direction of elastic deformation of the operating plate.

Therefore, even when the operating plate is excessively pressed outwardly, the amount of elastic deformation of the operating plate is limited by the elastic deformation limitation piece portion, thereby positively preventing the breakage and damage of the operating plate.

In the present invention, the efficiency of the operation for mounting the interior illumination lamp on the ceiling plate of the vehicle can be enhanced, and besides the maintenance operation can be effected easily.

DETAILED DESCRIPTION OF THE PREFERRED EMBODIMENTS

A preferred embodiment of the present invention will now be described in detail with reference to the drawings.

Figure 1:
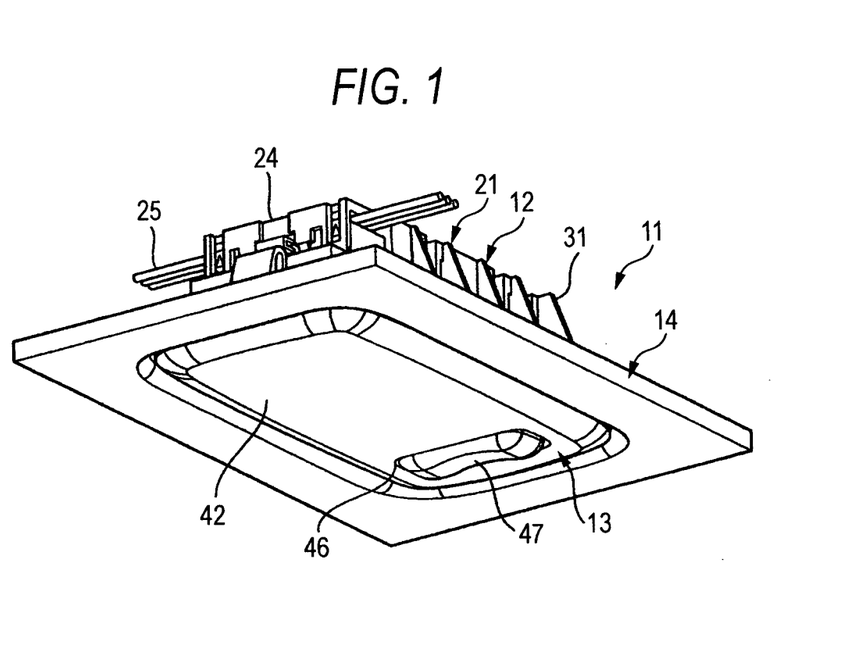
FIG. 1 is a perspective view showing the structure of a preferred embodiment of a vehicle interior illumination lamp of the present invention.
Figure 2:
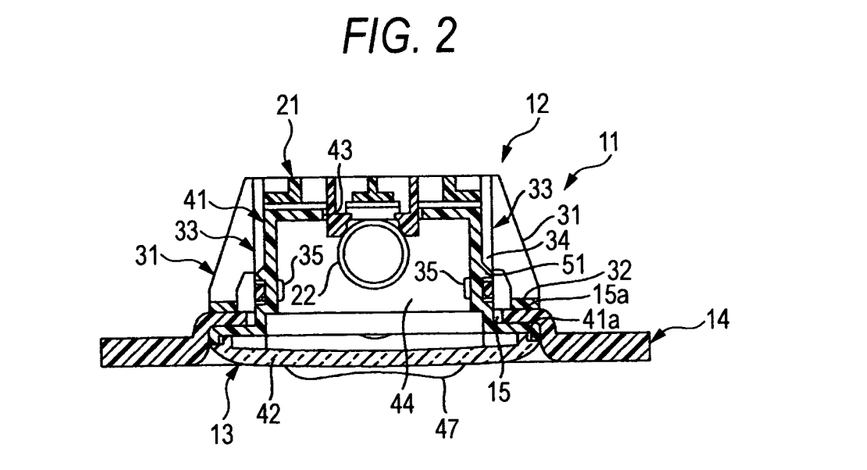
FIG. 2 is a cross-sectional view showing an important portion of the structure of the interior illumination lamp of FIG. 1.
Figure 3:
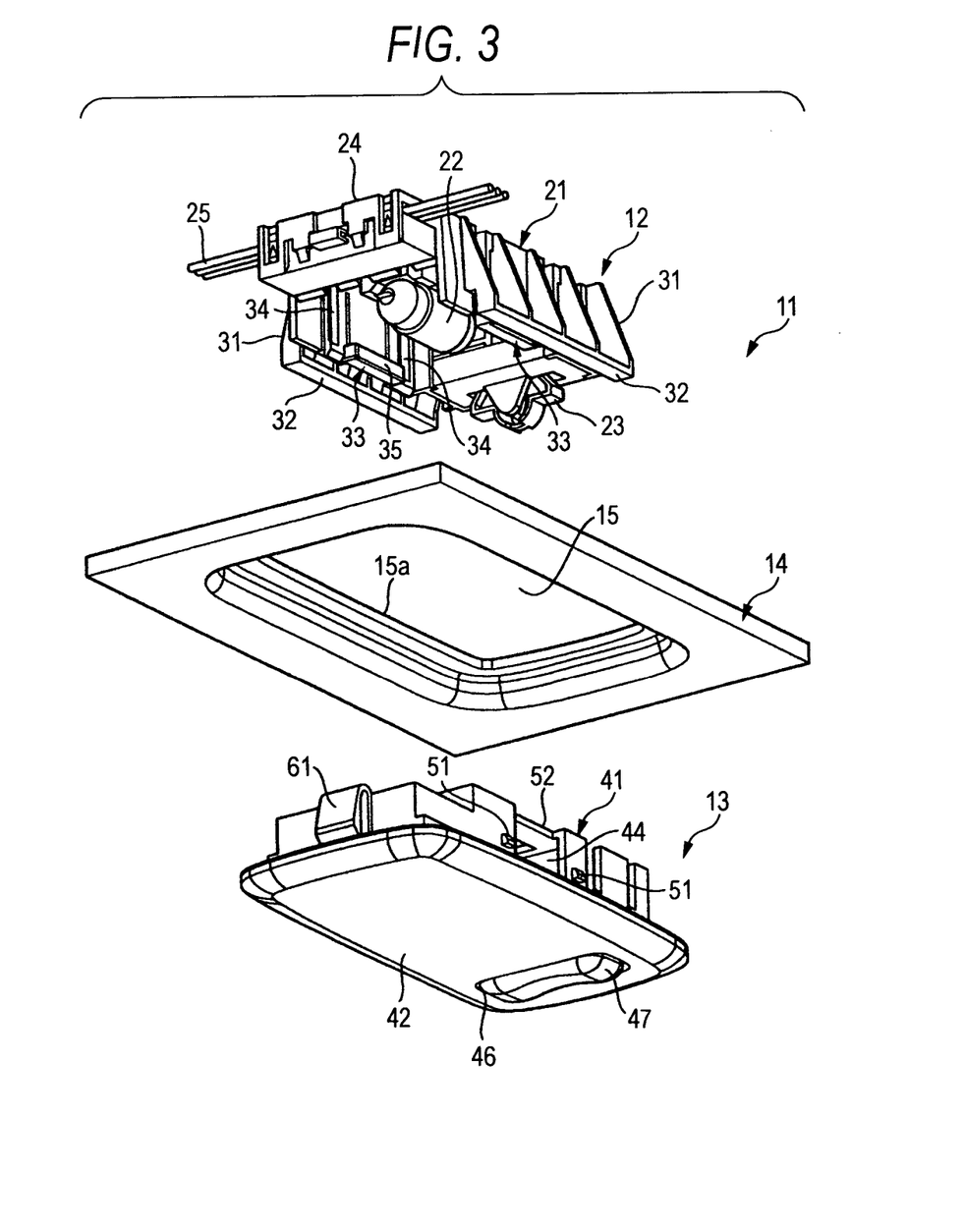
FIG. 3 is an exploded, perspective view showing the structure of the interior illumination lamp of FIG. 1.
Figure 4:
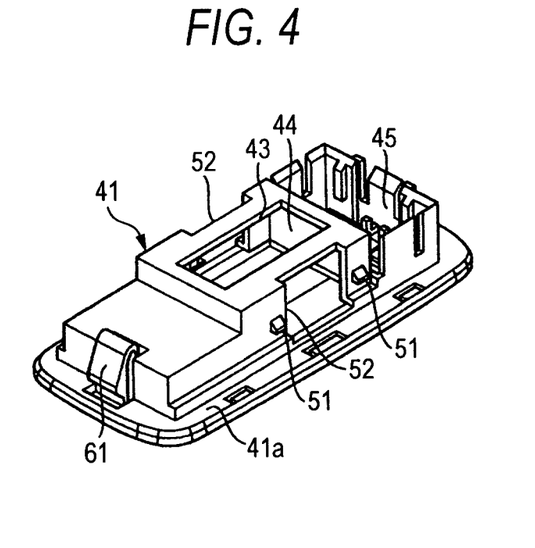
FIG. 4 is a perspective view showing the structure of a design portion of the interior illumination lamp of FIG. 1.

FIG. 1 is a perspective view showing the structure of the preferred embodiment of a vehicle interior illumination lamp of the invention, FIG. 2 is a cross-sectional view showing an important portion of the structure of the interior illumination lamp of FIG. 1, FIG. 3 is an exploded, perspective view showing the structure of the interior illumination lamp of FIG. 1, and FIG. 4 is a perspective view showing the structure of a design portion of the interior illumination lamp of FIG. 1.

As shown in FIGS. 1 to 3, the vehicle interior illumination lamp 11 comprises a function portion 12, and the design portion 13.

The function portion 12 is disposed at a reverse side of a ceiling plate 14 forming a ceiling of a vehicle, and is mounted thereon to be exposed to an opening 15 of a generally rectangular shape formed through the ceiling plate 14. The design portion 13 is mounted in such a manner that it is fitted in the opening 15 in the ceiling plate 14.

The function portion 12 includes a housing 21 of an integral construction molded of a synthetic resin. An incandescent bulb (hereinafter referred to merely as "bulb") 22 and a switch 23 (which are electrical parts) are provided within the housing 21.

The function portion 12 has a connection portion 24 formed at one end portion thereof, and a wire harness 25 is held in this connection portion 24. At this connection potion 24, wires of the wire harness 25 are electrically connected by press-fitting to contacts of bus bars (not shown) connected to the bulb 22 and the switch 23.

The housing 21 has holding portions 31 formed respectively at opposite sides thereof. A holding plate portion 32 is formed on each of the holding portions 31, and extends in a longitudinal direction, and these holding plate portions 32 can abut against the ceiling plate 14.

The housing 21 also has operating plates 33 disposed inwardly respectively of the holding portions 31. The operating plates 33 are connected at their upper ends to an upper portion of the housing 21. Each of the operating plates 33 can be elastically deformed at its lower end portion upon application of a laterally-acting force thereto.

Each of the operating plates 33 has retaining portions 34 each in the form of a notch, and retaining claws 51 (described later) of the design portion 13 can be retainingly engaged with the retaining portions 34, respectively. Each operating plate 33 also has an operating projection 35 formed on and projecting inwardly from the lower end portion thereof.

The design portion 13 includes a base housing 41, and a lens cover 42 of a transparent or a translucent nature releasably attached to a lower side of the base housing 41.

A bulb receiving chamber 44, having an insertion port 43, is formed within the base housing 41, and the bulb 22, mounted on the function portion 12, is inserted into the bulb receiving chamber 44 through the insertion port 43, and is received therein. A switch receiving portion 45 is formed within the base housing 41, and the switch 23, provided at the function portion 12, is received in the switch receiving portion 45.

An operating lever 47 is provided in a lower portion of the switch receiving portion 45, and is exposed through a hole 46 formed through the lens cover 42. The operating lever 47 is connected to the switch 23 received in the switch receiving portion 45. With this construction, the switch 23 is turned on and off by operating the operating lever 47.

The retaining claws 51 are formed on and project laterally from the opposite side portions of the base housing 41. These retaining claws 51 can be retainingly engaged respectively with the retaining portions 34 formed at the operating plates 33 of the function portion 12.

Window portions 52, communicating with the bulb receiving chamber 44, are formed at the opposite side portions of the base housing 41. The operating projections 35, formed respectively on the operating plates 33 of the function portion 12, can be disposed in the window portions 52, respectively.

An upper surface of a peripheral portion of the base housing 41 serve as an abutment surface 41a, and when the base housing 41 is fitted into the opening 15 in the ceiling plate 14, the abutment surface 41a abuts against a lower surface of a peripheral edge portion of the opening 15 in the ceiling plate 14.

The base housing 41 has retaining claws 61 formed respectively at opposite end portions thereof. When the base housing 41 is fitted into the opening 15 in the ceiling plate 14, the retaining claws 61 are engaged with the peripheral edge portion of the opening 15 in the ceiling plate 14, thereby holding the base housing 41 on the ceiling plate 14.

The peripheral edge portion of the opening 15 in the ceiling plate 14 is first curved upwardly over an entire periphery thereof, and then extends inwardly to provide a projecting portion 15a.

Next, an operation for assembling the vehicle interior illumination lamp 11 of the above structure will be described. FIGS. 5A to 5D are cross-sectional views explanatory of the procedure of assembling the interior illumination lamp.

Figure 5:
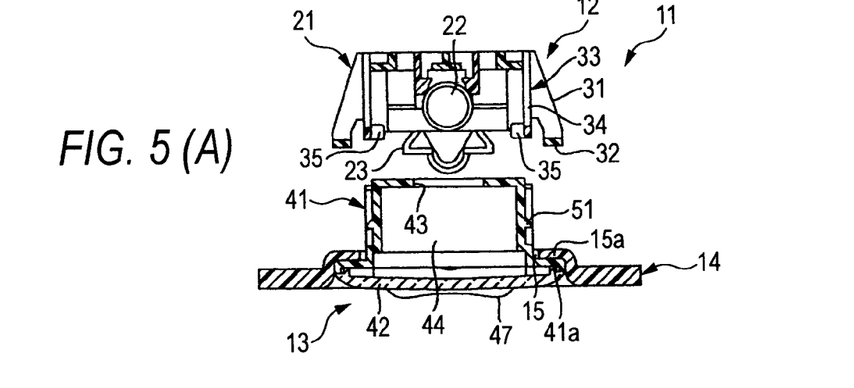
FIGS. 5A to 5D are cross-sectional views explanatory of the procedure of assembling the interior illumination lamp.

For assembling the vehicle interior illumination lamp 11, the function portion 12 is fitted on the design portion 13, fitted in the opening 15 in the ceiling plate 14, from the upper side as shown in FIG. 5A.

As a result, the operating plates 33 of the function portion 12 are disposed respectively at the opposite sides of the design portion 13, and also the bulb 22 is inserted into the bulb receiving chamber 44 through the insertion port 43 as shown in FIG. 5B.

In this condition, when the function portion 12 is further depressed toward the design portion 13, the operating plates 33 slide onto the retaining claws 51, and therefore are elastically deformed outwardly as shown in FIG. 5C.

When the function portion 12 is further depressed toward the design portion 13, the retaining claws 51 are engaged respectively in the retaining portions 34 of the operating plates 33, and also the holding plate portions 32, formed respectively on the holding portions 31 of the function portion 12, abut against the upper surface of the ceiling plate 14, so that the holding plate portions 32 and the abutment portion 41a hold the projecting portion 15a (formed at the peripheral edge of the opening 15 in the ceiling plate 14) therebetween as shown in FIG. 5D.

As a result, the vehicle interior illumination lamp 11 is assembled, and in this assembled condition the function portion 12 and the design portion 13 are engaged with each other to be combined together in a unitary manner, and the bulb 22 is received within the bulb receiving chamber 44, and the switch 23 is received within the switch receiving portion 45.

Next, an operation for the maintenance of the vehicle interior illumination lamp 11 of the above structure will be described. FIGS. 6A to 6D are cross-sectional views explanatory of the procedure of disassembling the interior illumination lamp.

Figure 6:
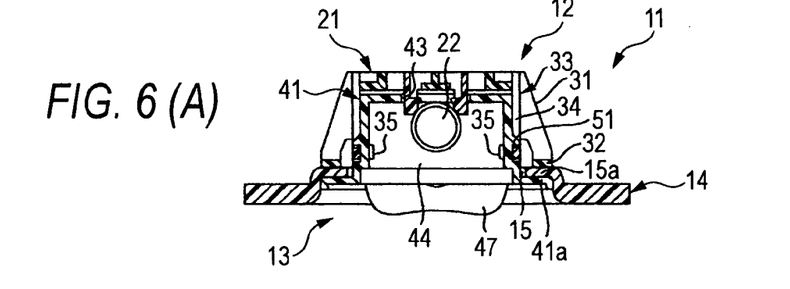
FIGS. 6A to 6D are cross-sectional views explanatory of the procedure of disassembling the interior illumination lamp.

For disassembling the vehicle interior illumination lamp 11 for maintenance purposes, first, the lens cover 42 is removed from the design portion 13 as shown in FIG. 6A.

Then, the operating projections 35, projecting into the bulb receiving chamber 44 in the base housing 41, are pressed from the inside of the bulb receiving chamber 44 as shown in FIG. 6B.

As a result, the operating plates 33 are elastically deformed outwardly, and the retaining portions 34 are disengaged from the retaining claws 51, respectively, so that the retained condition of the design portion 13 and function portion 12 relative to each other is released.

In this condition, the function portion 12 and the design portion 13 are moved away from each other as shown in FIG. 6C, and therefore the function portion 12 is moved apart from the design portion 13, and the bulb 22 and the switch 23 are extracted respectively from the bulb receiving chamber 44 and the switch receiving portion 45 as shown in FIG. 6D. Thus, the function portion 12 is separated from the design portion 13.

By thus separating the function portion 12 and the design portion 13 from each other, a maintenance operation for the function portion 12 and the design portion 13 can be carried out.

After the maintenance operation, the base housing 41 of the design portion 13 is fitted into the housing 21 of the function portion 12, and the fingers are engaged with the operating projections 35 projecting into the bulb receiving chamber 44 through the respective window portions 52, and the function portion 12 is pulled toward the design portion 13 by the fingers.

As a result, the operating plates 33 slide onto the retaining claws 51, and are elastically deformed outwardly, and the retaining claws 51 are engaged respectively in the retaining portions 34 of the operating plates 33, and also the holding plate portions 32 of the function portion 12 and the abutment portion 41a of the design portion 13 hold the projecting portion 15a of the ceiling plate 14 therebetween.

As a result, the vehicle interior illumination lamp 11 is again assembled, and in this assembled condition the function portion 12 and the design portion 13 are engaged with each other to be combined together in a unitary manner, and the bulb 22 is received within the bulb receiving chamber 44, and the switch 23 is received within the switch receiving portion 45.

As described above, in the vehicle interior illumination lamp 11 of the above embodiment, when the design portion 13 is fitted in the function portion 12 through the ceiling plate 14, the retaining portions 34 of the operating plates 33 of the function portion 12 are retainingly engaged with the retaining claws 51 of the design portion 13, respectively, so that the design portion 13 is attached to the function portion 12. Therefore, the efficiency of the operation for assembling the function portion 12 and the design portion 13 together can be greatly enhanced. Therefore, the efficiency of an ordinary assembling operation in a production line can be enhanced, thus enhancing the productivity.

The operating plates 33 are pressed from the inside of the housing 41 of the design portion 13, and are elastically deformed. By doing so, the engagement of the retaining portions 34 with the respective retaining claws 51 can be quite easily released without the use of any special jig and any special operation, so that the function portion 12 and the design portion 13 can be separated from each other, and the maintenance operation can be easily effected without the need for removing the ceiling plate 14.

And besides, by effecting one extraction operation, that is, by pressing the operating plates 33 outwardly, the retained condition, achieved at the plurality of retained portions, can be released, and therefore the efficiency of the maintenance operation can be further enhanced.

Furthermore, the elastically-deformable operating plates 33 which can be brought into and out of engagement with the design portion 13 are provided separately from the holding portions 31 for holding the ceiling plate 14, and therefore the holding portions 31 do not need to be elastically deformed. Therefore, the holding portions 31 can be formed into such a shape as to increase the strength thereof, and the sufficient strength of mounting of the interior illumination lamp on the ceiling plate 14 can be secured.

The fingers are engaged with the operating projections 35 projecting into the bulb receiving chamber 44 of the design portion 13, and the function portion 12 is pulled toward the design portion 13 by the fingers. By doing so, the design portion 13 can be easily fitted into the function portion 12, and the function portion and the design portion can be combined together, with the retaining portions 34 of the operating plates 33 of the function portion 12 engaged with the respective retaining claws 51 of the design portion 13.

Thus, the function portion 12 and the design portion 13 which have been separated from each other for maintenance purposes can be combined together, and therefore the maintenance operation can be carried out more easily.

And besides, thanks to the provision of the operating projections 35, the retaining regions where the retaining claws 51 and the retaining portions 34 are retainingly engaged with each other are inconspicuous when the interior illumination lamp is viewed from the lower side of the design portion 13.

Figure 7:
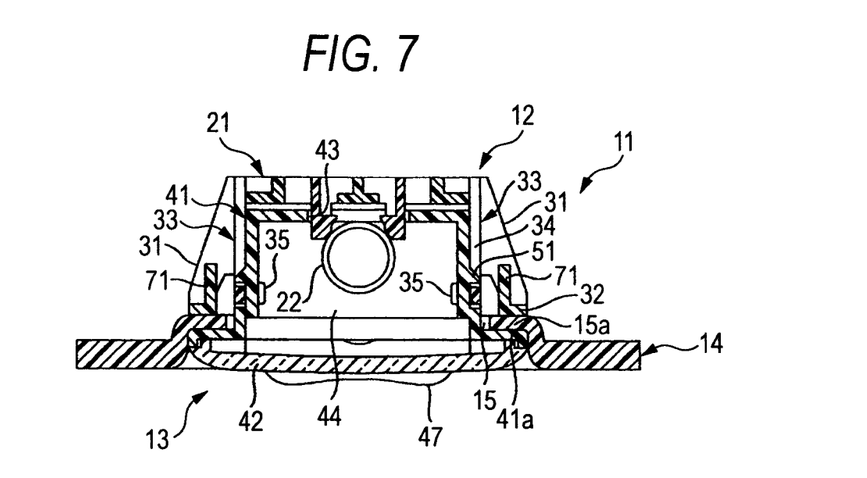
FIG. 7 is a cross-sectional view showing a modified example of the vehicle interior illumination lamp.

Next, a modified example of the vehicle interior illumination lamp will be described. FIG. 7 is a cross-sectional view showing the modified example of the vehicle interior illumination lamp.

In this vehicle interior illumination lamp 11, elastic deformation limitation piece portions 71 are formed respectively at inner edges of the holding plate portions 32 of the holding portions 31 as shown in FIG. 7. Each of the elastic deformation limitation piece portions 71 is disposed forwardly of the corresponding operating plate 33 (which is elastically deformed when the operating projection 35 is pressed outwardly) in the direction of elastic deformation of the operating plate 33.

Figure 8:
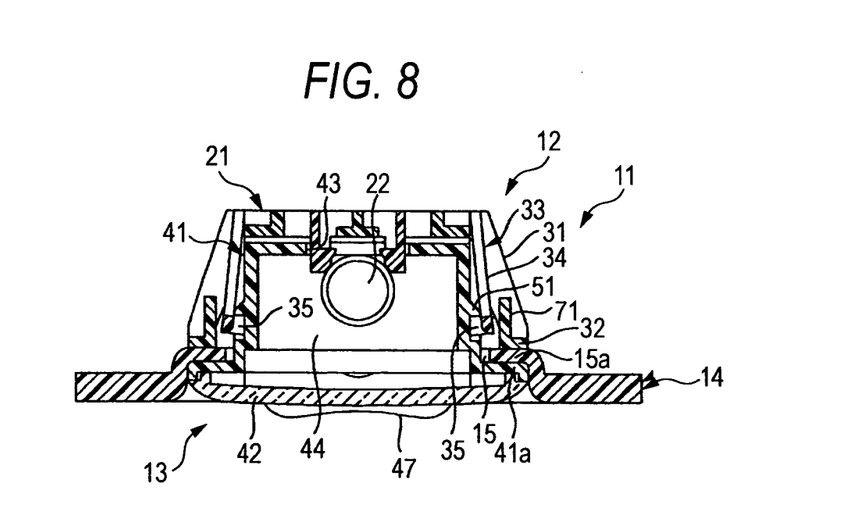
FIG. 8 is a cross-sectional view explanatory of the operation of the interior illumination lamp of FIG. 7.

As shown in FIG. 8, each elastic deformation limitation piece portion 71 is so disposed that a small gap is formed between this portion 71 and the corresponding operating plate 33 (which slides onto the retaining claws 51 to be elastically deformed when attaching the function portion 12 to the design portion 13) so as to secure the smooth assembling operation.

Figure 9:
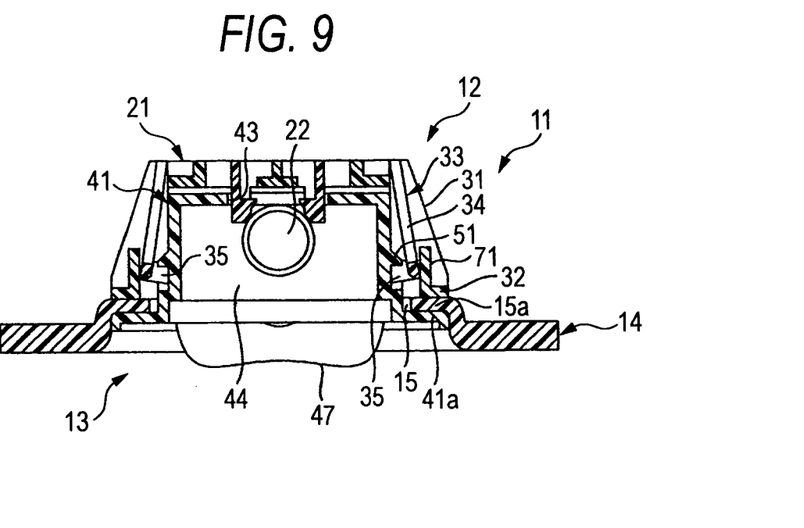
FIG. 9 is a cross-sectional view explanatory of the operation of the interior illumination lamp of FIG. 7.

In this vehicle interior illumination lamp 11, when each of the operating projections 35 is pressed hard outwardly from the inside of the bulb receiving chamber 44 of the base housing 41 so as to remove the function portion 12 from the design portion 13 for maintenance purposes, the elastically-deformable operating plate 33 is brought into abutting engagement with the elastic deformation limitation piece portion 71 disposed forwardly of the operating plate 33 in the direction of elastic deformation of the operating plate 33, as shown in FIG. 9.

Therefore, even when each operating plate 33 is excessively pressed outwardly, the amount of elastic deformation of the operating plate 33 is limited by the elastic deformation limitation piece portion 71, thereby positively preventing the breakage and damage of the operating plate 33.

The present invention is not limited to the above embodiment, and suitable modifications, improvements and so on can be made. The shape, dimensions, numerical values, form, number, disposition, etc., of each of the constituent elements of the above embodiment are arbitrary, and are not limited in so far as the invention can be achieved.

What is claimed is:

1. A vehicle interior illumination lamp comprising:
    a function portion and a design portion, when said design portion is fitted into said function portion such that an entire surface of a housing of said design portion, the surface facing the function portion, is housed within said function portion, said design portion and said function portion are combined together through a ceiling plate, and are mounted on said ceiling plate in such a manner that said design portion and said function portion holds said ceiling plate therebetween;
    a retaining claw provided with said design portion on a side surface thereof;
    an elastically-deformable operating plate having a retaining portion which is in retaining engagement with said retaining claw formed on said design portion such that an operating projection of the retaining portion extends out and around said retaining claw with respect to a vertical center of said design portion and projects into said housing when said design portion is fitted in said function portion, said elastically-deformable operating plate provided with the function portion,
    wherein, when said operating projection is pressed from inside the housing of said design portion to be elastically deformed, the retaining engagement of said retaining portion with said retaining claw is released.

2. A vehicle interior illumination lamp according to claim 1, wherein said operating plate has an operating projection projecting into the inside of said design portion fitted in said function portion.

3. A vehicle interior illumination lamp according to claim 2, wherein said function portion includes an elastic deformation limitation piece portion limiting an amount of elastic deformation of said operating plate in such a manner that said elastic deformation limitation piece portion is provided in a direction of elastic deformation of said operating plate.

4. A vehicle interior illumination lamp according to claim 1, wherein said function portion includes an elastic deformation limitation piece portion limiting an amount of elastic deformation of said operating plate in such a manner that said elastic deformation limitation piece portion is provided in a direction of elastic deformation of said operating plate.

5. A vehicle interior illumination lamp according to claim 1, wherein said operating projection projects inwardly with respect to the vertical center of said design portion.

6. A vehicle interior illumination lamp according to claim 1, wherein said operating projection projects out from a surface of the retaining portion facing inward with respect to the vertical center of said design portion.

7. A vehicle interior illumination lamp according to claim 1, wherein said operating projection projects through a window in said housing when said design portion is fitted in said function portion.

* * * * *